United States Patent
Vogtmeier

(10) Patent No.: US 8,314,412 B2
(45) Date of Patent: Nov. 20, 2012

(54) GRID AND METHOD OF MANUFACTURING A GRID FOR SELECTIVE TRANSMISSION OF ELECTROMAGNETIC RADIATION, PARTICULARLY X-RAY RADIATION FOR MAMMOGRAPHY APPLICATIONS

(75) Inventor: Geroen Vogtmeier, Aachen (DE)

(73) Assignee: Koninklijke Philips Electrnics N.V., Eindhoven (NL)

( * ) Notice: Subject to any disclaimer, the term of this patent is extended or adjusted under 35 U.S.C. 154(b) by 33 days.

(21) Appl. No.: 13/122,969

(22) PCT Filed: Oct. 7, 2009

(86) PCT No.: PCT/IB2009/054382
§ 371 (c)(1),
(2), (4) Date: Oct. 7, 2009

(87) PCT Pub. No.: WO2010/044008
PCT Pub. Date: Apr. 7, 2011

(65) Prior Publication Data
US 2011/0192997 A1    Aug. 11, 2011

(30) Foreign Application Priority Data
Oct. 13, 2008   (EP) .................................. 08166445

(51) Int. Cl.
*B32B 37/06* (2006.01)
(52) U.S. Cl. ...................... 250/505.1; 378/154; 378/145
(58) Field of Classification Search ............... 250/505.1; 378/154, 145
See application file for complete search history.

(56) References Cited

U.S. PATENT DOCUMENTS

| 5,099,134 A | 3/1992 | Hase et al. |
| 5,814,235 A * | 9/1998 | Pellegrino et al. ............... 216/12 |
| 6,951,628 B2 * | 10/2005 | Eidam et al. ................... 264/401 |
| 6,980,629 B1 | 12/2005 | Hoheisel et al. |
| 2003/0081731 A1 | 5/2003 | Souchay et al. |
| 2004/0228447 A1 | 11/2004 | Dobbs et al. |
| 2011/0122999 A1 * | 5/2011 | Vogtmeier et al. ............. 378/154 |

FOREIGN PATENT DOCUMENTS
WO    2008007309 A1   1/2008

* cited by examiner

*Primary Examiner* — Kiet T Nguyen

(57) ABSTRACT

A method of manufacturing a grid (1) for selective transmission of electromagnetic radiation, particularly X-ray radiation, is proposed. The method comprises: providing a support element (3) having self-supporting stability, wherein the support element (3) is made with a material which essentially absorbs no electromagnetic radiation to be selectively transmitted through the grid; applying a metal layer (5) at a surface of the support element (3); and building a selective transmission structure (7) at a surface of the metal layer (5) with a material which absorbs electromagnetic radiation to be selectively transmitted through the grid, wherein the transmission structure is build using selective laser sintering. As the support element (3) provides sufficient mechanical stability but does not absorb the respective radiation, the selective transmission structure (7) build thereon using selective sintering might not have to be subsequently separated from a manufacturing substrate thereby preventing separation/dicing losses and, furthermore, might be structurally held and protected against damage during handling of the grid.

13 Claims, 4 Drawing Sheets

GRID AND METHOD OF MANUFACTURING A GRID FOR SELECTIVE TRANSMISSION OF ELECTROMAGNETIC RADIATION, PARTICULARLY X-RAY RADIATION FOR MAMMOGRAPHY APPLICATIONS

FIELD OF THE INVENTION

The present invention relates to a method of manufacturing a grid for selective transmission of electromagnetic radiation, particularly X-ray radiation for mammography applications. Furthermore, the present invention relates to a corresponding grid and to a medical imaging device comprising such grid.

BACKGROUND OF THE INVENTION

Grids for selective transmission of electromagnetic radiation may be used for example in medical imaging devices such as Computed Tomography scanners (CT), standard X-ray scanners like C-arm devices or mammography devices, Single Photon Emission Computed Tomography devices (SPECT) or Positron Emission Tomography scanners (PET). Other devices such as non-destructive X-ray testing devices may also use such grids. The grid may be positioned between a source of electromagnetic radiation such as an X-ray radiation source and a radiation-sensitive detection device. For example, in a CT scanner, the source of electromagnetic radiation may be an X-ray tube whereas in SPECT/PET a radioactive isotope injected into a patient may form a source of electromagnetic radiation. The radiation-sensitive detection device may be any arbitrary radiation detector such as a CCD-device, a scintillator based detector, a direct converter etc.

A grid may be used to selectively reduce the content of a certain kind of radiation that must not impinge onto the radiation-sensitive detection device. In a CT scanner, a grid may be used to reduce the amount of scattered radiation that is generated in an illuminated object and which may deteriorate the medical image quality. As today's scanners often apply cone-beam geometry, hence illuminate a large volume of an object, the amount of scattered radiation is often superior to the amount of the medical information carrying non-scattered primary radiation. For example, scattered radiation can easily amount to up to 90% or more of the overall radiation intensity, depending on the object.

Therefore, there may be a demand for grids that efficiently reduce scattered radiation. Grids fulfilling such demand may have radiation absorbing structures in two dimensions that form a selective transmission structure and that are called two-dimensional anti-scatter-grids (2D ASG). As such two-dimensional anti-scatter-grids may need to have transmission channels that are focused to a focal spot of the radiation source that emits the primary radiation which shall be allowed to be transmitted through the grids, the grid may have to exhibit a sophisticated geometrical structure and it may be complicated, time-consuming and costly to manufacture such grid.

WO 2008/007309 A1, filed by the same applicants as the present application, describes a grid for selective transmission of electromagnetic radiation with structural elements built by selective laser sintering. Therein, a method for manufacturing a grid comprises the step of growing at least a structural element by means of selective laser sintering from a powder material, particularly a powder of an essentially radiation-opaque material. Selective laser sintering allows for a large design freedom. Having a structural element that is built by selective laser sintering, the grid may be a highly complex three-dimensional structure that is not easily achievable by conventional moulding or milling techniques. Therein, the technology of selective laser sintering, sometimes also known as direct metal laser sintering, is not any longer a prototype technology but becomes a production technology for the manufacturing of three-dimensional devices with demanding geometries.

For CT-applications the typical dimension of a footprint of a two-dimensional grid is in the range of 2 cm×2 cm for a modular detector system with a height of for example about 27 mm.

In contrast hereto, the dimension of a grid typically used for mammography applications may be in the range of e.g. 18 cm×24 cm which is a much bigger footprint but the height is only about 2 mm. At the same time the typically required wall thickness may be even smaller compared to the wall thickness of CT grids which are in the range of about 100 µm.

A problem for the production of such large footprint grids may be the separation of the grid from a metal carrier that is normally used for smaller devices.

A device with a 2 cm×2 cm footprint can be separated from the carrier by dicing, wire erosion or even by producing a kind of perforation, which may be achieved by not continuously sintering the sinter material by stopping the laser power appropriately to establish a predetermined breaking point.

However, for grids usable for example in mammography applications having a large footprint and a low thickness it might be complicated to, after preparation using selective laser sintering, separate the grid from the underlying metal carrier. For example, with respect to the thickness of such grid being about 2 mm, material losses induced by the separation process using dicing, which may be in the range of about 1 mm thickness, are a significant loss in both, sinter material and work effort. Furthermore, even if it would be possible to efficiently separate the grid from the necessary carrier or building platform, the handling of such thin and not very stable grid layer might be an issue.

SUMMARY OF THE INVENTION

Accordingly, there may be a need for an improved method of manufacturing a grid for selective transmission of electromagnetic radiation which method may reduce or prevent the problems in connection with separating the grid from an underlying carrier substrate and/or which may simplify the handling of such grid during the manufacturing procedure, especially for the case of a grid having a large area or footprint and a small thickness. Furthermore, there may be a need for a corresponding grid and a medical imaging device comprising such grid which, due to the improved manufacturing method, may be produced at lower costs and/or with higher reliability.

These needs may be met by the subject-matter according to one of the independent claims. Advantageous embodiments of the present invention are described in the dependent claims.

According to a first aspect of the present invention, a method for manufacturing a grid for selective transmission of electromagnetic radiation, particularly X-ray radiation, is proposed. The method comprises: providing a support element having self-supporting stability, wherein the support element is made with a material which essentially absorbs no electromagnetic radiation to be selectively transmitted through the grid; applying a metal layer at a surface of the support element; and building a selective transmission structure at a surface of the metal layer with a material which absorbs electromagnetic radiation to be selectively transmitted through the grid, wherein the transmission structure is built using selective laser sintering.

According to a second aspect of the present invention, a grid for selective transmission of electromagnetic radiation is proposed. The grid may be manufactured with the method according to the first aspect and comprises: a support element having self-supporting stability and being made with a material which essentially absorbs no electromagnetic radiation to be selectively transmitted through the grid; a metal layer at a surface of the support element; and a selective transmission structure at a surface of the metal layer with a material which absorbs electromagnetic radiation to be selectively transmitted through the grid, wherein the transmission structure comprises structural characteristics arising from being built using selective laser sintering.

According to a third aspect of the present invention, a medical imaging device such as a CT-scanner, an X-ray C-arm system, an X-ray mammography system, a SPECT-scanner or a PET-scanner comprising a grid according to the above second aspect of the present invention is proposed.

A gist of the present invention may be seen as being based on the following idea:

An essential feature of the proposed manufacturing method is the use of a special carrier or support element. A base material may be an X-ray transparent material (or more generally, a material transparent to the electromagnetic radiation to be transmitted through the grid) that has not much absorption as the absorption should be as low as possible at the position of the grid for the radiation that should be detected after the object to be examined, for example, in the case of mammography, of the patient's breast. Advantageously, the support element shall have at least one of the following properties: (1.) To stabilize a selective transmission structure which may serve as the actual two-dimensional structured grid and which might be thin and might have a thickness of less than 5 mm, preferably about 2 mm, and which might be made from sintered metal powder; (2.) The support element might protect the grid as a final outside cover; and (3.) The support element might serve as a ground plane for the metal laser sintering process used for preparing the actual selective transmission structure. Especially for the third functionality, it might be necessary to have a metallized layer as a base layer for the process. On top of this metal layer, metal powder might be raked and the sintering process with the optional melting of powder and sticking to the metal layer of the support element might start.

The provision of a support element which may be used both during manufacturing and during the actual application may simplify the manufacturing process. Furthermore, as the support element, due to its lacking absorption, may remain on the selective transmission structure during the actual application, no separation from a carrier used during the selective laser sintering process is necessary.

In the following, possible features and advantages of embodiments of the proposed manufacturing method and the proposed grid will be described.

The grid which may be manufactured using the proposed method may be specially adapted for selective transmission of X-ray radiation and may be specifically adapted for mammography applications.

The support element shall have self-supporting stability. This may mean that the support element, under normal operation conditions or handling conditions, is self-supporting, i.e. does not need further means to stabilize the support element or to prevent damages like cracking thereof. In other words, the support element might have a stability which is sufficient such that, on the one hand, the support element may be easily handled without risking damaging thereof and, on the other hand, it may even serve as a carrier for a selective transmission structure to be applied thereon.

The support element should comprise or consist of a material which essentially absorbs no electromagnetic radiation of the kind to which the grid is specifically adapted for selective transmission. For example, in X-ray applications, the material used for the grid should essentially absorb no X-rays. Herein, "essentially" may be interpreted in that with respect to the specific application in which the manufactured grid shall be used, the absorption of incoming electromagnetic radiation shall be negligible.

Onto a surface of the support element, a metal layer shall be applied. For this purpose, various methods may be used as will be explained further below. In contrast to the support element, the material used for the metal layer may absorb incoming electromagnetic radiation. However, the thickness of the metal layer may be thin enough such that the contribution of the metal layer to the overall absorption may be minor and may preferably be negligible. The metal layer may serve as a base or starting layer or seeding layer for the selective transmission structure to be subsequently built on a surface thereof. Preferably, the metal layer may be formed with the same material as the selective transmission structure and with the same geometry footprint as the selective transmission structure.

According to another embodiment, the metal layer is adapted in its geometry and thickness to serve as one of a shadow mask and a spectral filter for the electromagnetic radiation. For this purpose, the metal layer may be provided as a continuous layer which may even extend beyond the footprint of the selective transmission structure and the thickness of which may be adapted such that it provides for a desired X-ray absorption. Alternatively, the metal layer may also be structured such as to include openings/holes therein. The cross section of such openings might be slightly smaller than the cross section of channels of the selective transmission structure. Thereby, on the one hand, additional shadowing might occur due to the protruding metal layer such that not all radiation reaches the detector positioned behind the grid. On the other hand, such grid structure might be less sensitive to misalignment, geometrical tolerances, undesired slight curvature of walls, etc. of the selective transmission structure. For example, a focal spot which slightly varies its position would then not project a shadow of the wall onto a detector surface, which e.g. upon rotation in a CT-system would otherwise create a dynamically varying shadow which can hardly be corrected.

The selective transmission structure may provide for the actual selective transmission properties of the entire grid. It may be provided in any two-dimensional or three-dimensional geometry which is suitably adapted for selectively transmitting electromagnetic radiation. For example, the selective transmission structure may have vertical walls which are slightly tilted such as to be directed to a focal point of a source of electromagnetic radiation. Surfaces of the selective transmission structure may be curved, e.g. spherically shaped. Particularly, a two-dimensional grid having focused channels may have a spatially rather complex structure. The channels may have a rectangular or hexagonal inner shape which may require channel walls having different angulations.

The material or the particles from which the selective transmission structure is formed significantly absorb the specific electromagnetic radiation, preferably X-ray radiation, to which the grid shall be adapted. Therein, it may depend on the application and/or on the structural size, e.g. the thickness of radiation absorbing channel walls, whether a material can be considered as radiation-transparent or radiation-absorbing. Herein, the term radiation-transparent or essentially non-absorbent for electromagnetic radiation shall be defined as absorbing a, referred to a specific application, insignificant portion, e.g. less than 10%, of the incident radiation upon transition through the grid. The term radiation-absorbing shall be defined as absorbing a significant portion, e.g. more than 10% and preferably more than 50% and more preferred more than 90%, of the incident radiation upon transition through the grid. In mammography applications, X-ray energies of about 20 keV may be used. For these energies, molybdenum (Mo) or copper (Cu) can be considered as highly radiation-absorbing which may mean that grid walls fulfilling the requirements of certain geometry parameters like wall thickness (e.g. 20 μm), channel height (e.g. 2 mm), etc. lead to absorption of the kind of radiation that is to be selectively absorbed so that a noticeable improvement of a quality parameter of the radiation detection may occur. A quality parameter may be the scattered-radiation-to-primary-radiation ratio (SPR), the signal-to-noise ratio (SNR) or the like. For CT applications in the range of e.g. 120 keV, molybdenum (Mo) or other refractory materials (e.g. tungsten) can be considered as highly radiation-absorbent but other materials like copper or titanium are likewise essentially radiation-absorbent if the structure is made in the appropriate thickness. Furthermore, while pure plastic materials are usually to be considered as radiation-transparent for all ranges of medically relevant X-ray energies, metal powder-filled plastics may be considered radiation-absorbent provided that the power content is sufficiently high. As the selective transmission structure is directly made from a radiation-absorbing material, the required radiation-absorbing properties of the grid are inherent to the sintered selective transmission structure.

For building the selective transmission structure, a material thereof may be provided as particles which may then be sintered together using the well-known selective laser sintering (SLS) process. In SLS, a powder material is sintered together using a fine laser beam of appropriate energy. The object to be made is sintered layer-by-layer and the resulting object is subsequently immersed in the powder material so that a next layer of powder material can be sintered on top of the already existing sintered structure. In this way, rather complex three-dimensional structures can be formed, e.g. having cavities or combinations of convex and concave structural parts, etc. Selective laser sintering allows for generating fine structures from e.g. molybdenum powder by selectively illuminating the top powder layer with a high-intensity laser beam. The grain size of the metal powder may be chosen according to the required structure size and surface roughness. Typical structure sizes (corresponding to channel wall thickness) for e.g. CT grids are about 50 μm to 300 μm such that grain sizes of about 1 μm to 10 μm may suffice. For PET/SPECT devices, typical structure sizes may be about 100 to 1.000 μm so that grain sizes of about 5 to 50 μm may suffice. For regular X-ray applications, typical structure sizes may be about 10 to 50 μm so that grain sizes of about 0.1 to 5 μm may suffice. For mammography applications even smaller grain sizes might be beneficial. The mentioned numbers are only exemplary and shall not be understood as limiting.

According to an embodiment of the present invention, a thickness of the support element is larger than a thickness of the selective transmission structure. Generally, the thickness of the support element might be chosen such as to provide sufficient stability while at the same time preferably minimizing scattering effects. I.e. the support element should be thick enough to be self-supporting and should be preferably thin enough not to generate disturbing scatter effects. For example, the support element may have a thickness of more than 5 mm, preferably more than 1 cm whereas the selective transmission structure may have a thickness of less than 5 mm, preferably less than 3 mm. Thereby, the support element may have a sufficient mechanical stability in order to be self-supporting while the selective transmission structure can be adapted in its thickness to conform to specific requirements for example for mammography applications. For example, the support element might serve as a protection housing for the selective transmission structure applied thereon.

According to a further embodiment of the present invention, a thickness of the support element is substantially larger than a thickness of the metal layer. For example, the thickness of the support structure may be more than double, preferably more than 5 times and more preferred more than 10 times the thickness of the metal layer. Accordingly, while the support element can provide for the sufficient stability, the metal layer can be thin enough to, on the one hand, save metal layer material and, on the other hand, not provide for excessive X-ray absorption. For example, the metal layer may have a thickness of less than 1 mm, preferably less than 100 μm. Particularly in the case of a continuous metal layer the metal layer thickness should be preferably less than 25 μm and more preferred less than 10 μm in order to prevent excessive absorption.

According to a further embodiment of the present invention, the metal layer is structured such as to have a geometry which corresponds to a footprint of the selective transmission structure. In other words, the design or outline of the metal layer may be selected such that they correspond to the footprint of the selective transmission structure, i.e. the surface of the selective transmission structure directed towards the metal layer. Again in other words, the metal layer may be structured such that only regions where the metal layer contacts the selective transmission structure actually contain metal material while regions in between are left empty. Thereby, no additional absorption would arise from the metal layer as the geometry of the metal layer structure matches the geometry of the walls of the selective transmission structure built on top thereon. Accordingly, with such geometrically adapted structure, the thickness of the metal layer does not necessarily need to be minimized in order to prevent interfering absorption effects of the metal layer and may be thicker than e.g. 25 μm.

According to a further embodiment of the present invention, the structuring of the metal layer is performed using at least one of photolithography, locally etching, wire erosion and laser ablation. All these techniques are known to be able to provide highly complex structures or geometries in a metal layer. For example, using photolithography, areas of a metal layer can be protected and non-covered areas can be etched such that geometries having a structure size down to less than 100 nm may be achieved. In another approach, locally etching might be realized by locally applying an etching solution such as for example by screen printing an etching paste or ink-jet printing an etching solution. Wire erosion may be used to locally remove areas of a metal layer. The same can be achieved by laser ablation wherein a high energy laser may locally evaporate areas of a metal layer.

According to a further embodiment of the present invention, the selective transmission structure is made with molybdenum. Molybdenum is known to be highly X-ray absorbing. At the same time, molybdenum powder can be easily processed by selective laser sintering. Molybdenum can also be used for the metal layer. Other metals such as tungsten (W) or copper (Cu) or silver (Ag) or combinations of these materials could also be used as a metal layer and/or then also as a material for the manufacturing of the laser sintered selective transmission structure Mixtures of materials may be provided with a layer-wise change of material or mix of grains in the powder or coated powder grains.

According to a further embodiment of the present invention, the support element is made with a carbon fibre material. Such material is both mechanically stable and withstands high temperatures as they might occur in the following laser sintering process.

According to a further embodiment, an adhesion enhancement layer is interposed between the support element and the metal layer. Such adhesion enhancement layer may support the adhesion of the metal layer to the surface of the support element. Thereby, depending on the material mix of the support element and the used metal different interface optimizing materials might have to be used to ensure a proper adhesion of the metal layer to the support element.

According to a further embodiment of the present invention, the metal layer is applied to the support element using at least one of evaporation, sputtering, chemical vapour deposition, physical vapour deposition and gluing. Each of these technologies may be used for depositing or adhering the metal layer to the surface of the support element.

According to a further embodiment of the present invention, the metal layer may be provided as a locally etched metal foil that has the geometry of the selective transmission structure as footprint. The walls of the selective transmission structure could then be directly built onto such foil. Then only the mechanical fixation of the foil to the support element has to be ensured and might be implemented by gluing.

It is to be noted that the order of the process steps defined in the method claim may vary. For example, the support element may be provided first, then a metal layer may be applied to its surface and then a selective transmission structure may be built at the surface of the metal layer. However, in an alternative embodiment, a metal layer may be provided supported for example in a specially adapted construction environment and a selective transmission structure is built on this metal layer and only thereafter, the metal layer together with the selective transmission structure built thereon is applied to a support element for example by gluing or bonding.

Finally, it has to be noted that aspects and embodiments of the present invention have been described with reference to different subject-matters, mainly with respect to the proposed manufacturing method. In particular, some embodiments have been described with reference to the method type claims whereas other embodiments have been described with reference to apparatus type claims. However, a person skilled in the art will gather from the above and the following description that, unless other notified, in addition to any combination or features belonging to one type of subject-matter also any combination between features relating to different subject-matters, in particular between features of the apparatus type claims and features of the method type claims, is considered to be disclosed with this application.

BRIEF DESCRIPTION OF THE DRAWINGS

Features and advantages of the present invention will be further described with respect to specific embodiments as shown in the accompanying figures but to which the invention shall not be limited.

The drawings in the figures are only schematically and not to scale. Similar elements in the figures are referred to with similar reference signs.

DETAILED DESCRIPTION OF PREFERRED EMBODIMENTS

Figure 1:
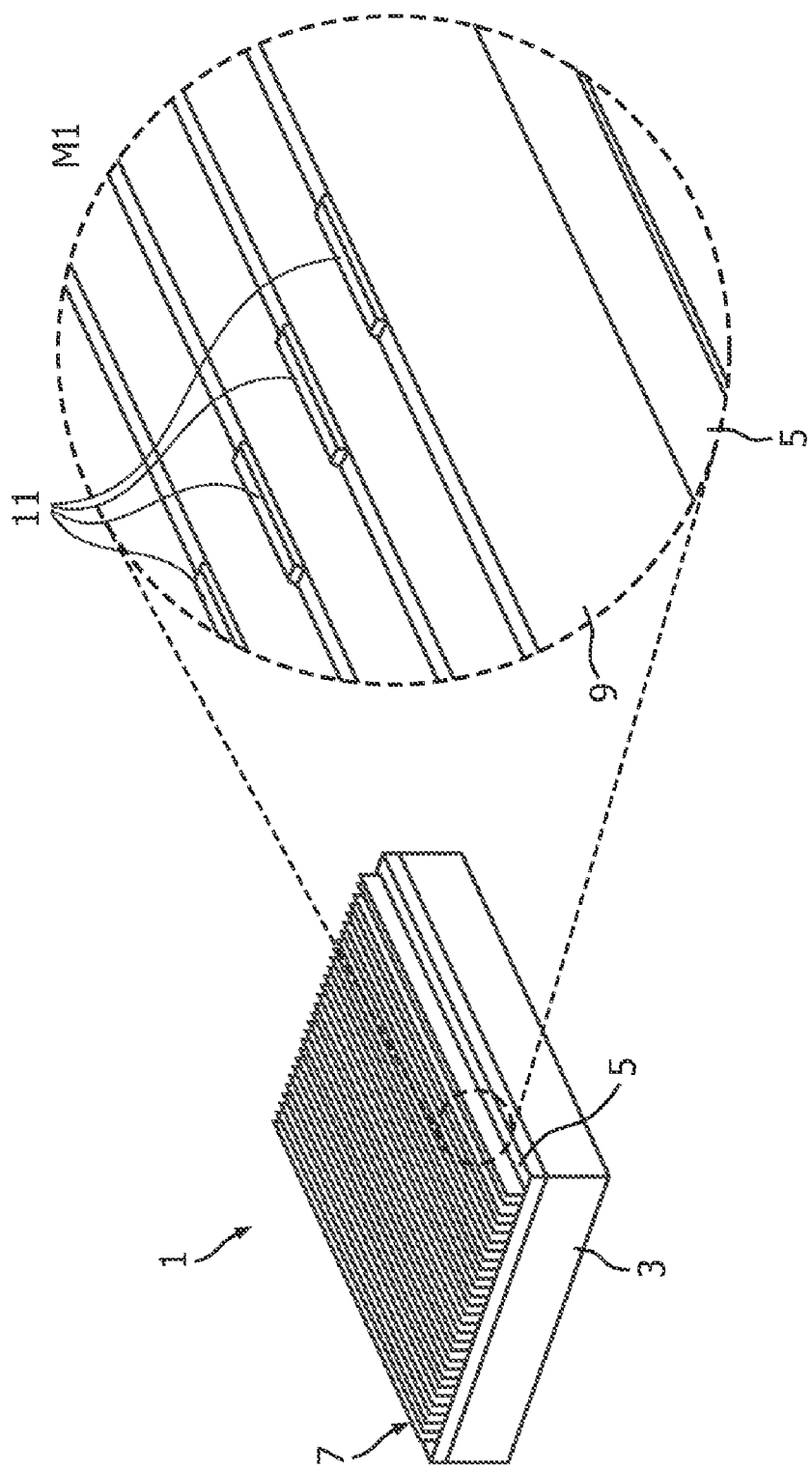
FIG. 1 shows an elevated perspective view of a comb-like grid according to an embodiment of the present invention.

An exemplary embodiment of a method of manufacturing a grid 1 for selective transmission of electromagnetic radiation according to the invention will be described with reference to FIGS. 1, 2 and 3.

In a first step, a support element 3 having self-supporting stability and being made for example with carbon fibres is coated with a thin layer 5 of metal such as molybdenum or tungsten. The thus coated support element is then positioned in a working chamber of a selective laser sintering device. The precise positioning with respect to the position of the laser beam of the SLS device may be achieved by a previous system calibration. The metal layer 5 may serve as a base layer or seeding layer for the subsequent laser sintering process. After a layer of metal powder is arranged on the metal sheet, selective laser sintering is used to sinter a first layer of a sintered selective transmission structure 7 to be manufactured. After the first layer is completed, a next layer of metal powder is arranged on top of the metal layer 5 and the previously sintered structures 7. This can be combined with a slight tilt of the working chamber. If the focussing line of the laser is positioned with a small distance to the previous line it is possible to build walls with a defined angulation with respect to the metal sheet.

FIG. 1 shows on the left-hand side a comb-like grid structure serving as selective transmission structure 7 that results after several layers of metal powder have been sintered. On the right-hand side of FIG. 1, a magnification M1 of a portion of the comb-like structure as indicated by the circle on the left-hand side of FIG. 1 is shown. The comb-like structure has a base that is formed by the thin metal layer 5. Sintered longitudinal wall structures 9 are shown that extend over the length of the metal layer 5. On top of the walls 9, optional alignment structures 11 are depicted.

Figure 2:
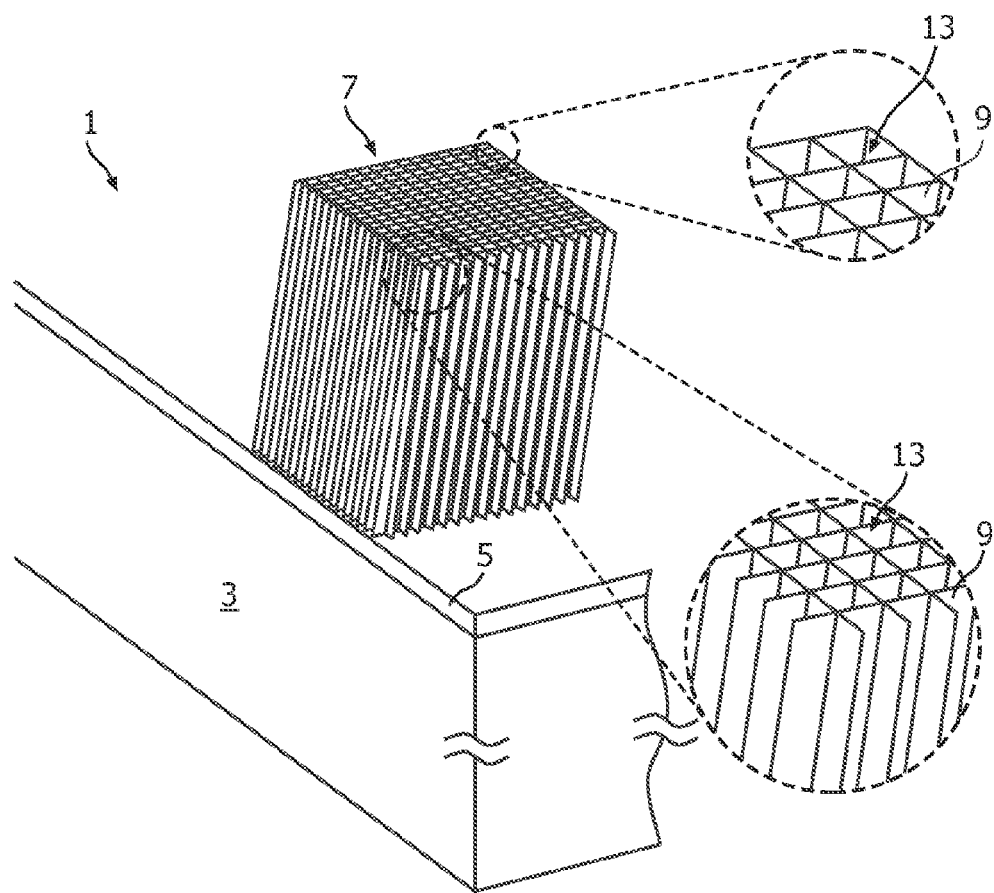
FIG. 2 shows an elevated perspective view of a grid structure including channels according to an alternative embodiment of the present invention.

An alternative grid 1 is shown in FIG. 2 in a partly cut-away fashion. A thin metal layer 5 is deposited on a much thicker supporting element 3. For illustration purposes the thickness relations are only schematically indicated and it should be noted that the supporting element 3 is significantly thicker than both, the metal layer 5 and the selective transmission structure 7 prepared thereon. The grid 1 comprises a 3-dimensional selective transmission structure 7 build on the metal layer 5 and including vertical walls 9 arranged perpendicular to each other. As can be clearly seen in the enlarged portions of FIG. 1, the walls 9 form longitudinal channels 13 though which electromagnetic radiation can easily pass. However, radiation which is irradiated under an angle not parallel to the channels 13 will be absorbed within the walls 9 as the walls 9 comprises a radiation-absorbing material. It is to be noted that focussed and non focussed 2D-ASGs might be interesting as well as focussed and non focussed 1D-structures.

Figure 3:
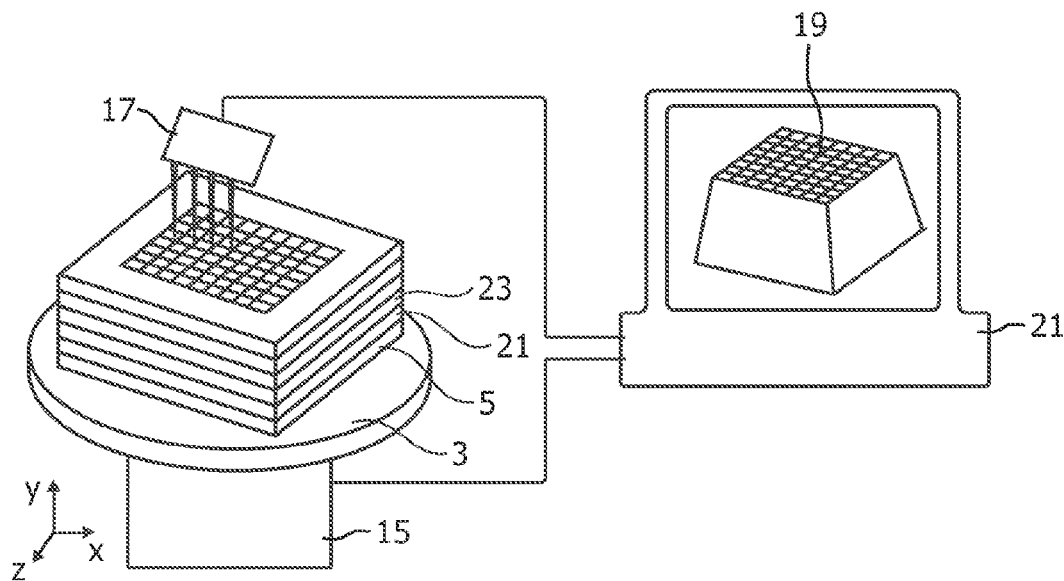
FIG. 3 schematically depicts a manufacturing method for a grid structure according to an embodiment of the present invention.

As schematically shown in FIG. 3, the selective transmission structure 7 can be built using a selective laser sintering technique. Therein, particles of a radiation-absorbing material are placed on the support element 3 and the metal layer 5 previously disposed thereon. The support element 3 is positioned on a table 15 which can be moved in the y-direction. Using a single laser and, optional, an arrangement for deflecting the laser beam or alternatively using a laser array 17, the particles may be sintered to each other at the location(s) of the focus of one or more laser beams. The laser array 17 may be controlled such that the location(s) of the focus of the one or more laser beams are scanned in x- and z-directions over the surface of the substrate in accordance with a 3-dimensional model 19 stored on a control unit 21 connected both to the laser array 17 and the table 15. After having scribed a first layer 23 of sintered particles, the table 15 can be moved downwards, the particles can be again evenly distributed over the surface of the already existing sintered structure and a second layer 25 of sintered particles can be generated using the laser array 17. Accordingly, the 3-dimensional model 19 stored in the control unit 21 may be reproduced by sintering particles layer-by-layer thereby producing the selective transmission structure 7. It might be even possible to make the structures or openings in the metal foil in the same machine which might be interesting as alignment would be much easier.

Figure 4:
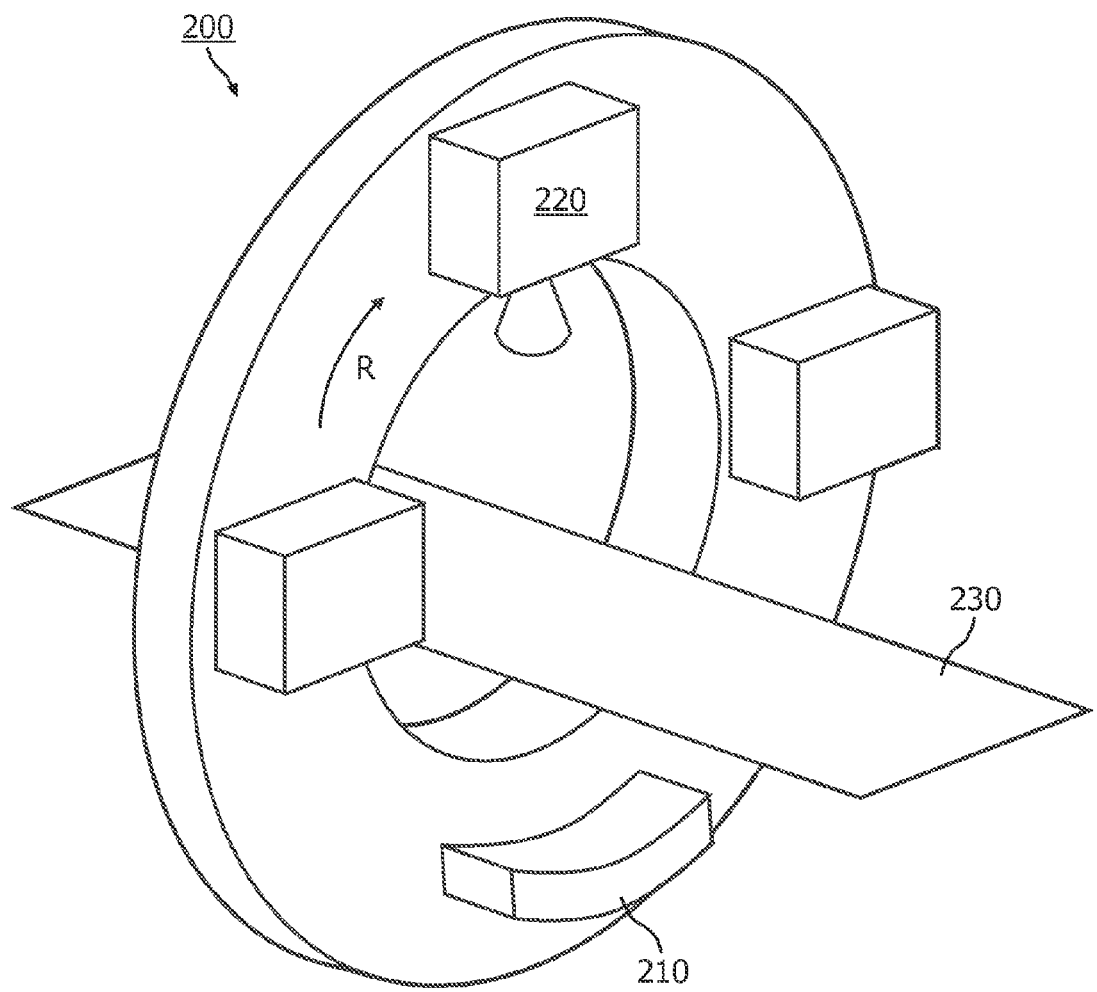
FIG. 4 shows a perspective view of an example of a medical imaging device with a grid according to an embodiment of the present invention.

In FIG. 4, an example of a medical imaging device 200 is shown. FIG. 4 shows the main features of a CT scanner, namely an X-ray source 220, a radiation detector 210 and a patient couch 230. The CT scanner may rotate around the object to be observed and may acquire projection images by means of radiation detection using the detector 210. A grid as described above according to the invention can be used in the detector 210 to reduce the amount of scatter radiation generated in the object to be observed.

Figure 5:
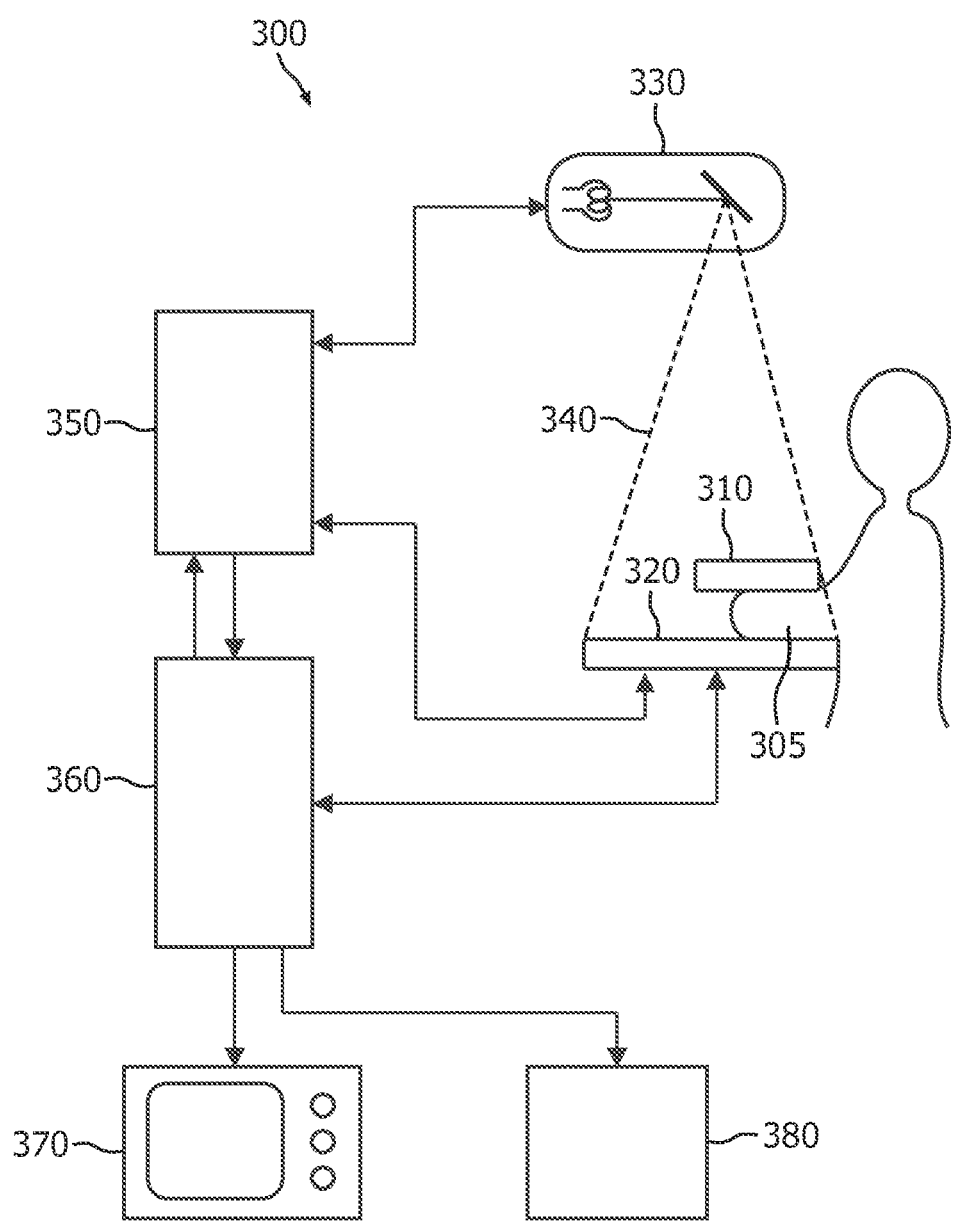
FIG. 5 shows a perspective view of an example of a mammography device with a grid according to an embodiment of the present invention.

FIG. 5 shows a mammography device 300. A female breast 305 may be arranged between a compression plate 310 and a detector arrangement 320. An X-ray tube 330 irradiates an X-ray beam 340 onto the breast 305. The X-ray tube 330 and the detector arrangement 320 are connector to a control 350, which may then supply control and detection data to an analysing unit 360. The analysing unit may send analysing data to a display 370 or store it in a memory 380. A grid as described above according to the invention can be used in the detector arrangement 320 to reduce the amount of scatter radiation generated in the breast 305 to be observed.

Finally, it should be noted that the terms "comprising", "including", etc. do not exclude other elements or steps and the terms "a" or "an" do not exclude a plurality of elements. Also, elements described in association with different embodiments may be combined. It should also be noted that reference signs in the claims should not be construed as limiting the scope of the claims.

The invention claimed is:

1. A method of manufacturing a grid (1) for selective transmission of electromagnetic radiation, the method comprising:

providing a support element (3) having self-supporting stability, wherein the support element is made with a material which essentially absorbs no electromagnetic radiation to be selectively transmitted through the grid;

applying a metal layer (5) at a surface of the support element; and building a selective transmission structure (7) at a surface of the metal layer (5) with a material which absorbs electromagnetic radiation to be selectively transmitted through the grid, wherein the transmission structure is build using selective laser sintering.

2. The method according to claim 1, wherein a thickness of the support element (3) is larger than a thickness of the selective transmission structure (7).

3. The method according to claim 1, wherein a thickness of the support element (3) is substantially larger than a thickness of the metal layer (5).

4. The method according to claim 1, wherein the metal layer (5) is structured such as to have a geometry which corresponds to a footprint of the selective transmission structure (7).

5. The method according to claim 4, wherein structuring of the metal layer (5) is performed using at least one of photolithography, locally etching, wire erosion and laser ablation.

6. The method according to claim 1, wherein the metal layer (5) is adapted in its geometry and thickness to serve as one of a shadow mask and a spectral filter.

7. The method according to claim 1, wherein the selective transmission structure (7) is made with at least one of molybdenum, tungsten, copper, silver and a mixture of these materials.

8. The method according to claim 1, wherein the support element (3) is made with a carbon fibre material.

9. The method according to claim 1, wherein an adhesion enhancement layer is interposed between the support element (3) and the metal layer (5).

10. The method according to claim 1, wherein the metal layer (5) is applied to the support element (3) using at least one of evaporation, sputtering, chemical vapor deposition, physical vapor deposition and gluing.

11. The method according to claim 1, wherein the metal layer (5) is provided as a locally etched metal foil that has the geometry of the selective transmission structure as footprint.

12. A grid (1) for selective transmission of electromagnetic radiation comprising:

a support element (3) having self-supporting stability, wherein the support element is made with a material which essentially absorbs no electromagnetic radiation to be selectively transmitted through the grid;

a metal layer (5) at a surface of the support element (3); and a selective transmission structure (7) at a surface of the metal layer (5) with a material which absorbs electromagnetic radiation to be selectively transmitted through the grid, wherein the transmission structure (7) is build using selective laser sintering.

13. A medical imaging device (200; 300) comprising a grid (1) according to claim 12.

* * * * *